United States Patent
Lee (10) Patent No.: US 9,435,375 B2
(45) Date of Patent: Sep. 6, 2016

(54) LINEAR SLIDE OVER-MOLDING FABRICATION METHOD, LINEAR SLIDE THUS MADE

(71) Applicant: Mao-Tu Lee, New Taipei (TW)

(72) Inventor: Mao-Tu Lee, New Taipei (TW)

( * ) Notice: Subject to any disclaimer, the term of this patent is extended or adjusted under 35 U.S.C. 154(b) by 32 days.

(21) Appl. No.: 14/580,167

(22) Filed: Dec. 22, 2014

(65) Prior Publication Data

US 2016/0178003 A1    Jun. 23, 2016

(51) Int. Cl.
| | | |
|---|---|---|
| F16C 29/06 | (2006.01) | |
| B29C 45/14 | (2006.01) | |
| B29K 705/00 | (2006.01) | |
| B29L 31/04 | (2006.01) | |

(52) U.S. Cl.
CPC ..... *F16C 29/0602* (2013.01); *B29C 45/14311* (2013.01); *F16C 29/0635* (2013.01); *B29C 2045/14327* (2013.01); *B29K 2705/00* (2013.01); *B29L 2031/04* (2013.01)

(58) Field of Classification Search
CPC ............ F16C 29/0602; F16C 29/0909; F16C 29/0666; F16C 33/34; F16C 43/04; F16C 2220/02; F16C 2220/04; F16C 2240/46
USPC ........ 384/13, 15, 44–45; 29/898.03, 898.13, 29/898.049; 264/273, 275–276, 279
See application file for complete search history.

(56) References Cited

U.S. PATENT DOCUMENTS

| | | | | | |
|---|---|---|---|---|---|
| 4,128,279 | A * | 12/1978 | Ernst | ................... | F16C 29/0676 384/43 |
| 5,951,168 | A * | 9/1999 | Teramachi | .......... | F16C 29/0602 384/45 |
| 6,045,265 | A * | 4/2000 | Shirai | ................. | F16C 29/0602 384/45 |
| 6,200,031 | B1 * | 3/2001 | Faulhaber | ................ | B23Q 1/40 384/45 |
| 6,217,217 | B1 * | 4/2001 | Teramachi | .......... | F16C 29/0602 384/44 |
| 6,712,511 | B2 * | 3/2004 | Matsui | ................ | F16C 29/0611 384/45 |
| 7,150,564 | B2 * | 12/2006 | Lee | ...................... | F16C 29/0607 384/15 |
| 7,736,060 | B2 * | 6/2010 | Matsumoto | ......... | F16C 29/0609 384/44 |
| 7,862,236 | B2 * | 1/2011 | Chen | ................... | F16C 29/0602 384/43 |
| 8,403,563 | B2 * | 3/2013 | Kakei | ................. | F16C 29/0609 384/44 |
| 8,858,082 | B2 * | 10/2014 | Hsu | ..................... | F16C 29/0642 384/43 |
| 2003/0185470 | A1 * | 10/2003 | Lee | ...................... | F16C 29/0664 384/45 |
| 2005/0018933 | A1 * | 1/2005 | Ishihara | .............. | F16C 29/0607 384/44 |

(Continued)

FOREIGN PATENT DOCUMENTS

| | | | | | |
|---|---|---|---|---|---|
| TW | M334223 | U | * | 1/1997 | ............. F16C 29/04 |
| TW | M334893 | U | * | 1/1997 | ............. F16C 29/04 |
| TW | M473454 | U | * | 3/2014 | ............. F16C 29/04 |

*Primary Examiner* — Marcus Charles
(74) *Attorney, Agent, or Firm* — Pai Patent & Trademark Law Firm; Chao-Chang David Pai (57) ABSTRACT

A linear slide over-molding fabrication method for producing a linear slide by putting a metal base onto a core in an injection mold and filling a molten plastic in the injection mold to mold guide structures on the metal base for guiding cylindrical rolling elements. The metal base has a track groove for matching with a linear guideway, guide structure attachment portions at two opposite sides of the track groove, and first joint surfaces at two opposite sides relative to the guide structure attachment portions. The core has guide structure forming portions corresponding to the guide structure attachment portions, second joint surfaces respectively facing toward the first joint surfaces with a gap about 0.02 mm~0.04 mm therebetween. Thus, the applied engineering plastic material can fill up the guide structure forming portions to form a plurality of guide structures on the two opposite sidewalls of the track groove.

8 Claims, 6 Drawing Sheets

(56) References Cited

U.S. PATENT DOCUMENTS

| | | | |
|---|---|---|---|
| 2006/0029307 A1* | 2/2006 | Fujimura | F16C 29/0657 384/45 |
| 2006/0120637 A1* | 6/2006 | Kuwabara | F16C 29/0607 384/44 |
| 2006/0262999 A1* | 11/2006 | Kurachi | F16C 33/3706 384/51 |
| 2007/0140602 A1* | 6/2007 | Hsu | F16C 29/0664 384/45 |
| 2008/0138002 A1* | 6/2008 | Yamaguchi | F16C 29/0602 384/44 |
| 2009/0136164 A1* | 5/2009 | Pfeuffer | F16C 29/0609 384/45 |
| 2009/0232427 A1* | 9/2009 | Wu | F16C 29/0611 384/44 |
| 2009/0245703 A1* | 10/2009 | Nishiwaki | F16C 29/0607 384/44 |
| 2010/0150483 A1* | 6/2010 | Aida | F16C 29/005 384/45 |
| 2011/0033141 A1* | 2/2011 | Chen | F16C 29/0609 384/45 |
| 2013/0170773 A1* | 7/2013 | Tsao | F16C 29/0635 384/13 |

* cited by examiner

LINEAR SLIDE OVER-MOLDING FABRICATION METHOD, LINEAR SLIDE THUS MADE

BACKGROUND OF THE INVENTION (a) Field of the Invention

The present invention relates to linear slide technology, and more particularly to a method of over-molding for producing a linear slide and a linear slide made by this method of over-molding.

(b) Description of the Prior Art

Taiwan Patent M437400 discloses a roller linear slide that uses cylindrical rolling elements for relative motion between the roller linear slide and a mating linear guideway, enabling the roller linear slide to move along the linear guideway. By means of the cylindrical rolling elements, the roller linear slide obtains better load capacity, and thus, the roller linear slide is practical for use in a machinery equipment to bear a heavy load. Further, as illustrated in Taiwan Patents M334223 and M371228, the aforesaid cylindrical rolling elements (rollers) must be installed in the plastic chain belt that is mounted in a load track and a non-load track (back-flow hole) at two opposite lateral sides of the track groove of the linear slide so that the cylindrical rolling elements can be rotated along the load track and non-load track and the circulators at two opposite ends of linear slide, facilitating movement of the linear slide in a state of low friction.

In order for the cylindrical rolling element-attached chain belt (or the cylindrical rolling elements themselves) to move along the load track and the non-load track, the roller linear slide is configured to provide plastic guide structures (or circulators) at the load track and non-load track thereof. The guide structures are of an assembled design, as indicated in Taiwan Patents M334893 and M473454. At first, guide structure components are made by injection molding, and then these guide structure components are mounted on the load track and non-load track of the linear slide metal base. This linear slide fabrication method needs to make plastic guide structure components by injection molding and then to install the fabricated plastic guide structure components in the linear slide metal base, thus complicating inventory control and costing much labor. Further, the cumulative tolerances of the plastic guide structure components greatly affect the quality and precision of the finished product.

SUMMARY OF THE INVENTION

The present invention has been accomplished under the circumstances in view. It is therefore the main object of the present invention to provide a linear slide over-molding fabrication method and a linear slide thus made, which employs an over-molding technique to mold guide structures on a bottom side of a linear slide metal base at two opposite lateral sides of a track groove, allowing formation of a joint surface between the linear slide metal base and a core in the cavity of the mold to avoid an overflow of molten plastic.

To achieve this and other objects of the present invention, a linear slide over-molding fabrication method in accordance with the present invention comprises a first step of preparing a linear slide metal base and placing said linear slide metal base in a cavity of an injection mold, and a second step of filling a molten engineering plastic material into the cavity of the injection mold to form guide structures on the metal base adapted for guiding a roller chain. The metal base comprises a straight track groove located in a bottom side in communication between opposing front and rear sides thereof for mating with a linear guideway, three guide structure attachment portions located in the bottom side at each of two opposite sidewalls of the straight track groove in a parallel relationship and in communication between the opposing front and rear sides of the metal base, two first joint surfaces located in the bottom side at each of the two opposite sidewalls of the straight track groove and at two opposite sides relative to the respective three guide structure attachment portions and in communication between the opposing front and rear sides of the metal base. The linear slide fabrication method further comprises a sub step of preparing at least one first core and placing the at least one first core in the cavity to fit the strait track groove of the linear slide metal base after the first step and prior to the second step. The first core comprises a plurality of guide structure forming portions corresponding to the guide structure attachment portions, and a plurality of second joint surfaces respectively disposed in proximity to the first joint surfaces with a gap about 0.02 mm~0.04 mm therebetween so that filling the molten engineering plastic material into the cavity of the injection mold causes the engineering plastic material to fill up the guide structure forming portions and to form guide structures on the guide structure attachment portions at the two opposite sidewalls of the track groove and a load track between each two adjacent guide structures.

To achieve this and other objects of the present invention, a linear slide in accordance with the present invention comprises a linear slide metal base, the linear slide metal base comprising a straight track groove located in a bottom side in communication between opposing front and rear sides thereof for mating with a linear guideway, three guide structure attachment portions located in the bottom side at each of two opposite sidewalls of the straight track groove in a parallel relationship and in communication between the opposing front and rear sides thereof, a load track defined between each two adjacent guide structure attachment portions, a plurality of first joint surfaces located in the bottom side at each of the two opposite sidewalls of the straight track groove and at two opposite sides relative to the respective three guide structure attachment portions and in communication between the opposing front and rear sides thereof, a plurality of back-flow holes respectively disposed in two opposite sidewalls thereof in communication between the opposing front and rear sides thereof and a plurality of sink holes respectively located in the opposing front and rear sides thereof and abutting opposing ends of the back-flow holes, a plurality of guide structures respectively molded on the guide structure attachment portions at the two opposite sidewalls of the straight track groove adapted for guiding cylindrical rolling elements of a chain belt, a non-load track and a back-flow guide structure molded in each back-flow hole, and a plurality of mounting bore columns molded on the opposing front and rear sides of the linear slide metal base and respectively partially embedded in the sink holes for the mounting of a circulator at each of the opposing front and rear sides of said linear slide metal base.

Subject to the design of the guide structure attachment portions and first joint surfaces at two opposite sidewalls of the track groove of the metal base, and the design of the guide structure forming portion and second joint surface of the first core, a gap about 0.02 mm~0.04 mm is maintained between each first joint surface and the associated second joint surface, and the track groove of the metal base can be smoothly fitted onto the first core in the injection mold; providing a gap about 0.02 mm~0.04 mm between each first joint surface and the associated second joint surface can effectively prohibit an overflow of the applied molten engineering plastic material, avoiding formation of plastic flush at the molded guide structures. Therefore, the invention employs over-molding to mold guide structures on the metal base at two opposite sidewalls of the track groove, achieving the effects of production efficiency improvement and cost reduction.

DETAILED DESCRIPTION OF THE PREFERRED EMBODIMENTS

Figure 1:
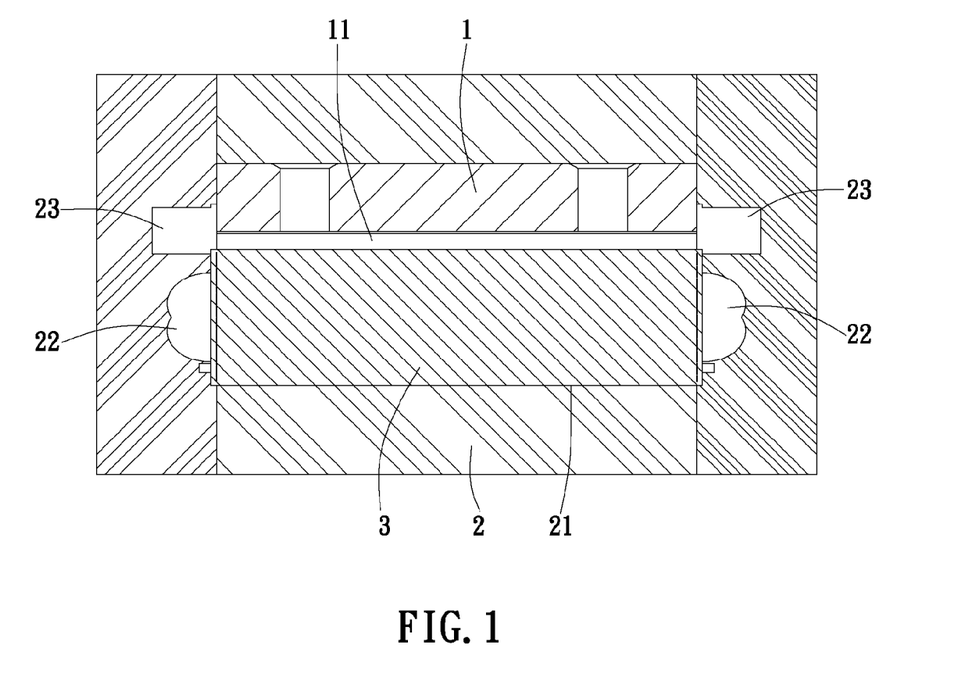
FIG. 1 is a schematic transverse sectional view illustrating a linear slide metal base and a core arranged in an injection mold in accordance with the present invention.
Figure 2:
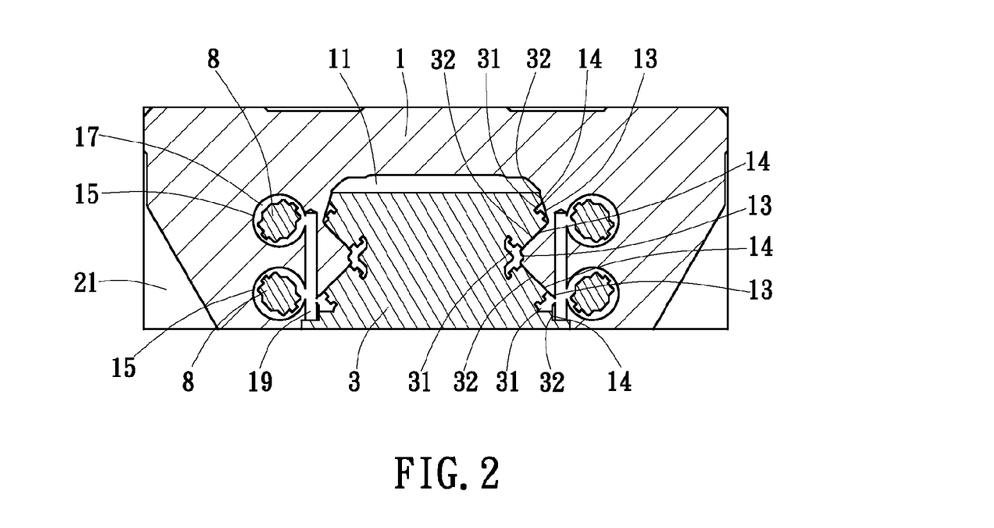
FIG. 2 is a schematic longitudinal sectional view of FIG. 1.

Referring to FIGS. 1 and 2, the present invention provides a method of over-molding for producing a linear slide and a linear slide made by this method of over-molding. More particularly, the invention provides a roller liner slide having a chain belt guide structure and a method for producing such a roller linear slide. This method of over-molding is performed by: putting a linear slide metal base 1 in a cavity 21 of an injection mold 2 for enabling a track groove 11 of the linear slide metal base 1 to be firmly supported on a first core 3 in the cavity 21, and then closing the injection mold 2 and filling a molten engineering plastic material 5 into the cavity 21 of the injection mold 2 (see FIG. 3) so as to form a plurality of roller chain belt guide structures 4 on two opposite sidewalls of the track groove 11 of the linear slide metal base 1 and a load track 12 between each two guide structures 4 (see FIGS. 4-7).

Figure 11:
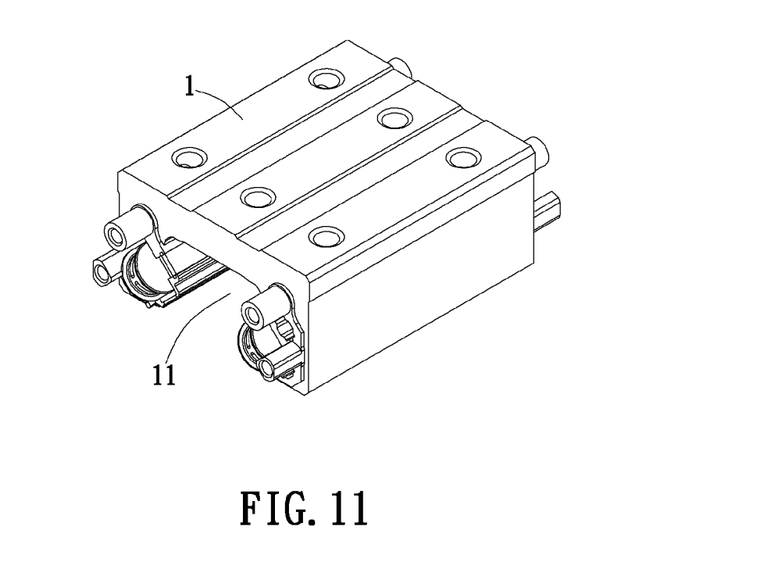
FIG. 11 is an oblique top elevational view of an alternate form of the metal base in accordance with the present invention.

The metal base 1 can be a trapezoidal metal block (see FIG. 5 and FIG. 6) or rectangular metal block (see FIG. 11) for use as the bearing body of the linear slide. The metal base 1 is processed to provide a track groove 11 that is located in the middle of the bottom wall thereof and straightly extends through opposing front and rear sides of the bottom wall to fit a predetermined linear guideway, three guide structure attachment portions 13 on each of two opposite sidewalls of the track groove 11 in a parallel relationship. The guide structure attachment portions 13 can be configured to provide a planar or arched cross section for the bonding of the applied engineering plastic material 5 to form the desired guide structures 4. Further, each guide structure attachment portion 13 extends along the track groove 11 to the opposing front and rear sides of the metal base 1. More particularly, two first joint surfaces 14 are respectively located at opposing top and bottom sides of each guide structure attachment portion 13. Preferably, these first joint surfaces 14 are planar surfaces extending along the track groove 11 to the opposing front and rear sides of the metal base 1.

Figure 5:
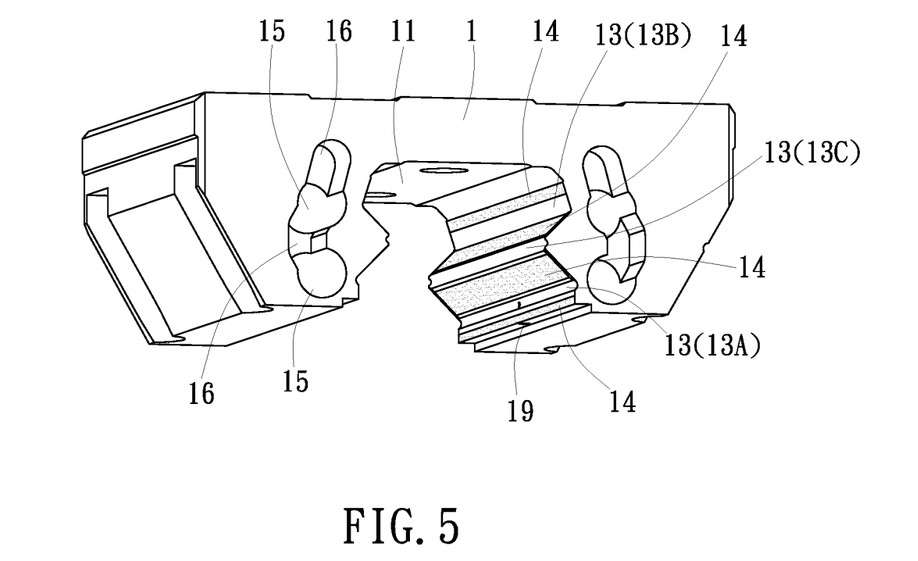
FIG. 5 is an oblique top elevational view of the linear slide metal base in accordance with the present invention.
Figure 6:
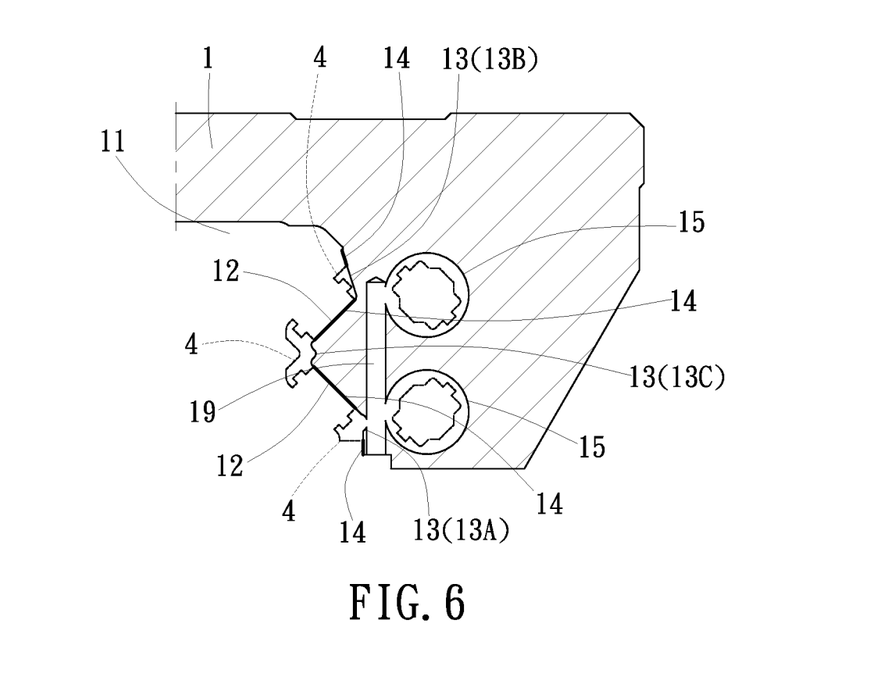
FIG. 6 is a sectional view of a part of the linear slide metal base in accordance with the present invention.
Figure 7:
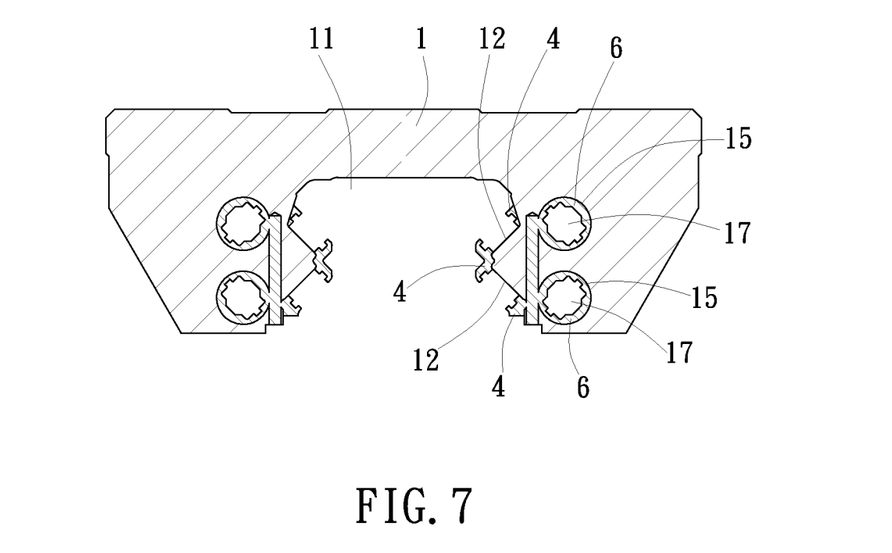
FIG. 7 is a sectional view of the linear slide metal base in accordance with the present invention.

The linear slide is normally used to bear a load. In this case, two rows of rollers will be provided in the two opposite sidewalls of the track groove 11. Therefore, as shown in FIG. 5 and FIG. 6, three guide structure attachment portions 13 are provided at each of the two opposite sidewalls of the track groove 11, namely, the first guide structure attachment portion 13A abutting the open side of the track groove 11, a second guide structure attachment portion 13B abutting the bottom side of the track groove 11, and the third guide structure attachment portion 13C disposed between the first guide structure attachment portion 13A and the second guide structure attachment portion 13B, thus, three guide structures 4 can be respectively formed on the three attachment portions 13 at each of the two opposite sidewalls of the track groove 11, and a load track 12 can be formed between each two adjacent guide structures 4 at each of the two opposite sidewalls of the track groove 11. Further, the two opposite sides of each of the first guide structure attachment portion 13A and second guide structure attachment portion 13B are respectively connected to the first joint surfaces 14; the two opposite lateral sides of the third guide structure attachment portion 13C are respectively connected to one respective first joint surface 14 at one side of the first guide structure attachment portion 13A and one respective first joint surface 14 at one side of the second guide structure attachment portion 13B.

Figure 3:
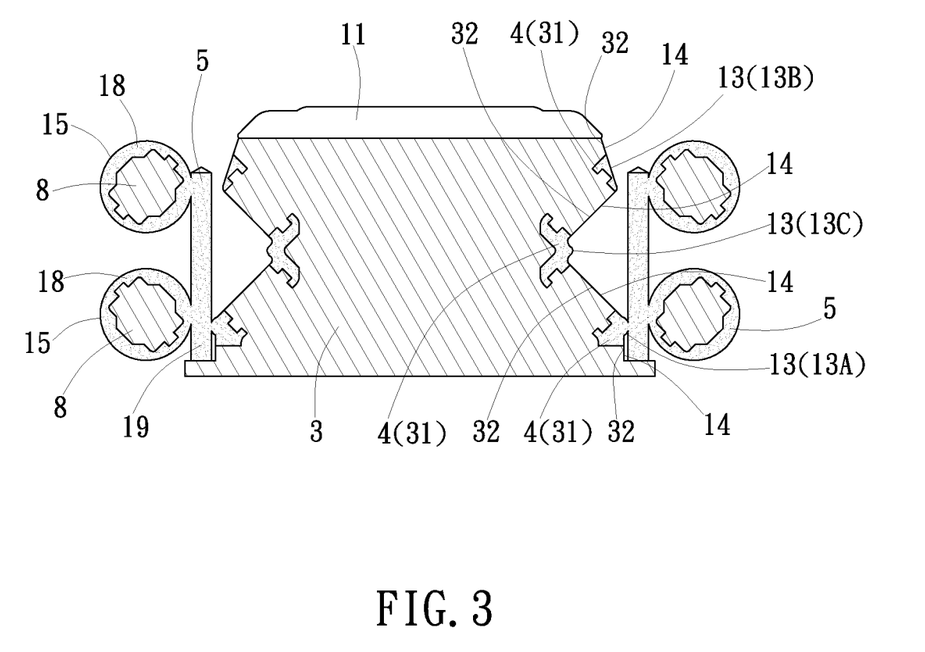
FIG. 3 is a cross-sectional view of a linear slide in accordance with the present invention.
Figure 4:
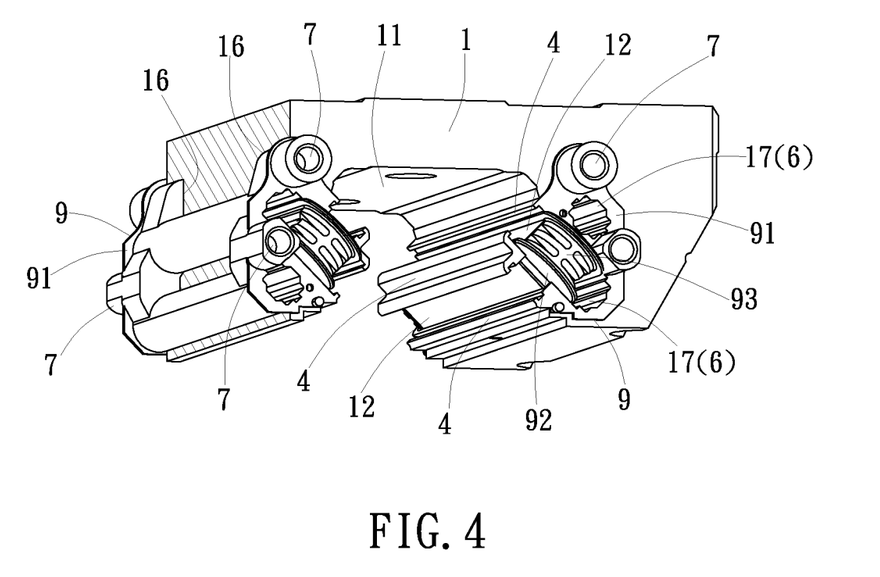
FIG. 4 is a sectional elevational view of the linear slide in accordance with the present invention.

Referring to FIG. 1, FIG. 2 and FIG. 3, the first core 3 is mounted in the cavity 21 of the injection mold 2. After the injection mold 2 is closed, the first core 3 is fitted into the track groove 11 of the metal base 1. The first core 3 comprises a plurality of guide structure forming portions 31 symmetrically located at two opposite sides thereof corresponding to the guide structure attachment portions 13, and a plurality of second joint surfaces 32 corresponding to the first joint surfaces 14, wherein the guide structure forming portions 31 are recessed portions located in two opposite sides of the first core 3 and extend to two opposite ends of the plastic molding space. Thus, after filling of the applied molten engineering plastic material 5 into the guide structure forming portions 31 (see FIG. 3), the desired guide structures 4 can thus be formed (see FIG. 4 and FIG. 6). The second joint surfaces 32 are respectively disposed corresponding to the respective first joint surface 14 with a gap of about 0.02 mm~0.04 mm therebetween. This gap enables the track groove 11 of the metal base 1 to be easily and axially fitted onto the first core 3 before molding, and facilitates removal of the metal base 1 from the first core 3 after molding. More specifically, the first core 3 has three guide structure forming portions 31 located in each of the two opposite sides thereof corresponding to the first, second and third guide structure attachment portions 13A, 13B, 13C. Further, the second joint surfaces 32 are respectively connected to the respective two opposite sides of the guide structure forming portions 31.

After the linear slide metal base 1 is placed in the cavity 21 of the injection mold 2 to fit the track groove 11 onto the first core 3 in the cavity 21 according to the aforesaid procedure (see FIG. 1 and FIG. 2), each first joint surface 14 of the metal base 1 matches with the respective second joint surface 32 of the first core 3 to form a relatively closed mold surface. Thus, after the cavity 21 of the injection mold 2 is fully closed, the cavity 21 of the injection mold 2 is disposed in communication with the two opposite ends of each guide structure forming portion 31. Thereafter, the injection molding machine is operated to fill the prepared molten engineering plastic material 5 into the cavity 21 and the guide structure forming portions 31 (see FIG. 3). Because the tolerance (0.02 mm~0.04 mm) between the first joint surface 14 of the metal base 1 and the second joint surface 32 of the first core 3 does not allow the applied molten engineering plastic material 5 to pass, the applied molten engineering plastic material 5 can simply flow over the two opposite sidewalls of the track groove 11 of the metal base 1 to form the desired guide structures 4 on the guide structure attachment portions 13 (see FIG. 3) for use to guide a roller chain belt, enabling rollers to rotate in the load tracks 12.

Referring to FIG. 2, FIG. 5 and FIG. 6, the metal base 1 is also processed to provide two pairs of back-flow holes 15 that are respectively disposed in two opposite sidewalls of the metal base 1 and extend through the opposing front and rear sides of the metal base 1, and a plurality of sink holes 16 that are respectively located in the opposing front and rear sides of the metal base 1 and abutting the ends of the back-flow holes 15 for the molding of a non-load track 17 and a back-flow guide structure 6 in each back-flow hole 15. The back-flow guide structures 6 are disposed in communication with the load tracks 12 through a circulator that extends around the opposing front and rear sides of the metal base 1, wherein the sink holes 16 are adapted for receiving a part of the applied molten engineering plastic material 5 that is molded on the metal base 1 to form mounting bore columns 7, and thus the part of the applied molten engineering plastic material that forms the mounting bore columns 7 and the part of the applied molten engineering plastic material that is molded in the non-load track 17 are integrally joined together and embedded in the sink holes 16. Further, the sink holes 16 prohibit the mounting bore columns 7 from splitting upon mounting of a respective screw therein. Molding of the back-flow guide structures 6 on the non-load tracks 17 are explained hereinafter with reference to FIG. 2 and FIG.3. Second cores 8 are mounted in the injection mold 2 with a back-flow hole 15 provided around each second core 8 upon closing of the injection mold, leaving each second core 8 in communication with the opposing front and rear sides of the metal base 1, and a back-flow guide structure forming portion 18 is provided between each second core 8 and the inner wall of the respective back-flow hole 15 with two opposite ends thereof kept in communication with the cavity 21, and thus, after filling of the applied molten engineering plastic material 5 into the back-flow guide structure forming portions 18, the desired non-load tracks 17 and back-flow guide structures 6 are simultaneously molded (see FIG. 4).

Figure 8:
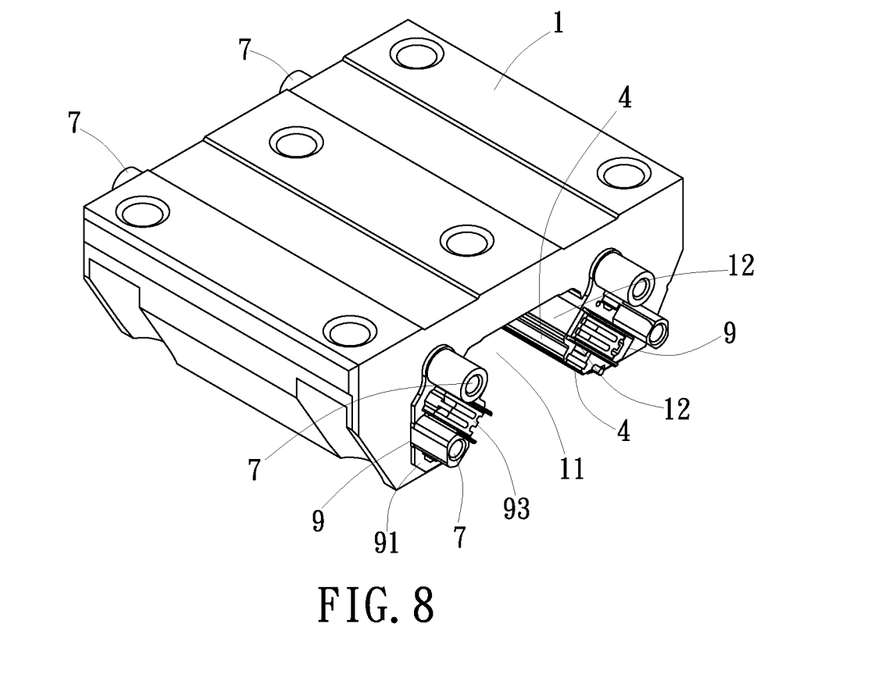
FIG. 8 is an oblique top elevational view of the linear slide metal base in accordance with the present invention.
Figure 9:
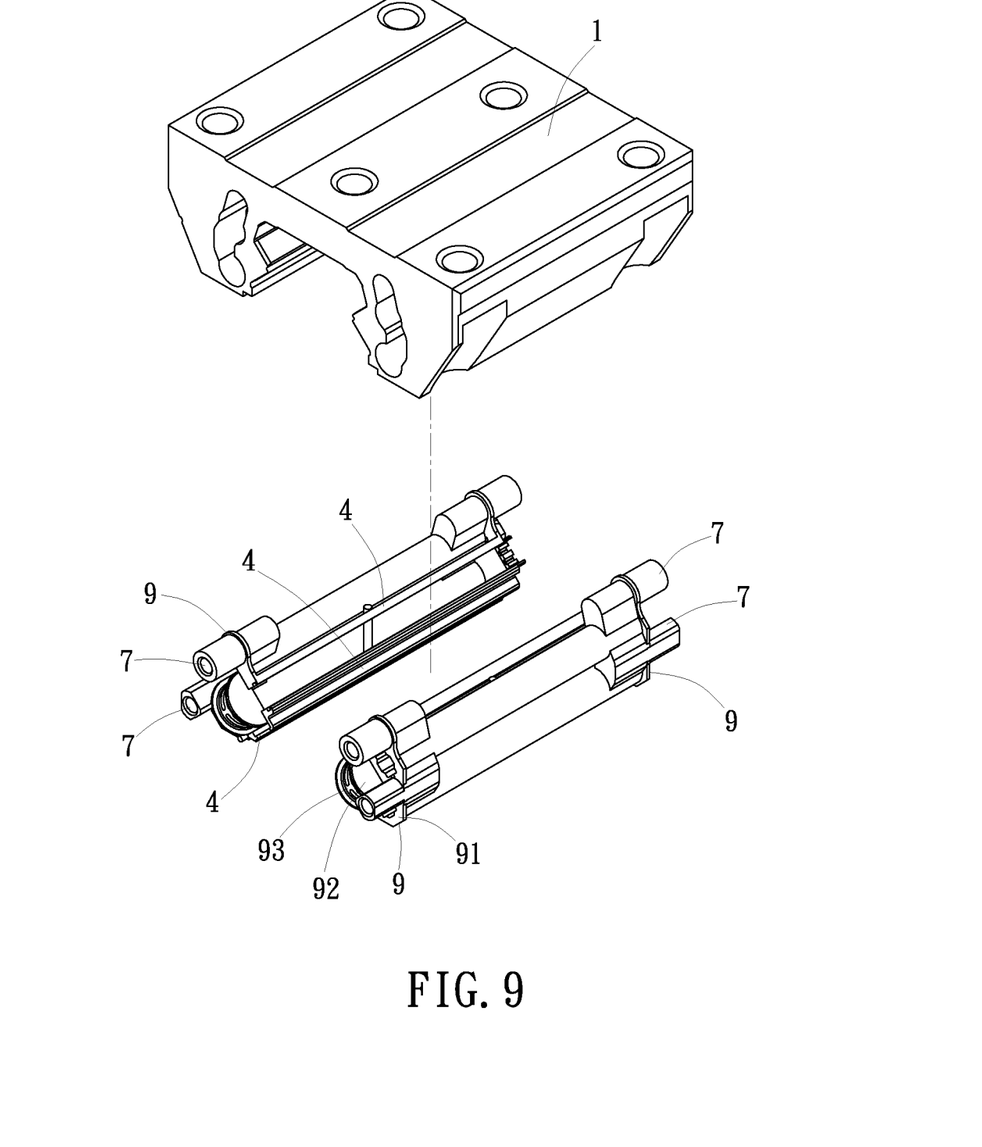
FIG. 9 is an exploded view of the linear slide metal base and molded plastic parts of the linear slide in accordance with the present invention.
Figure 10:
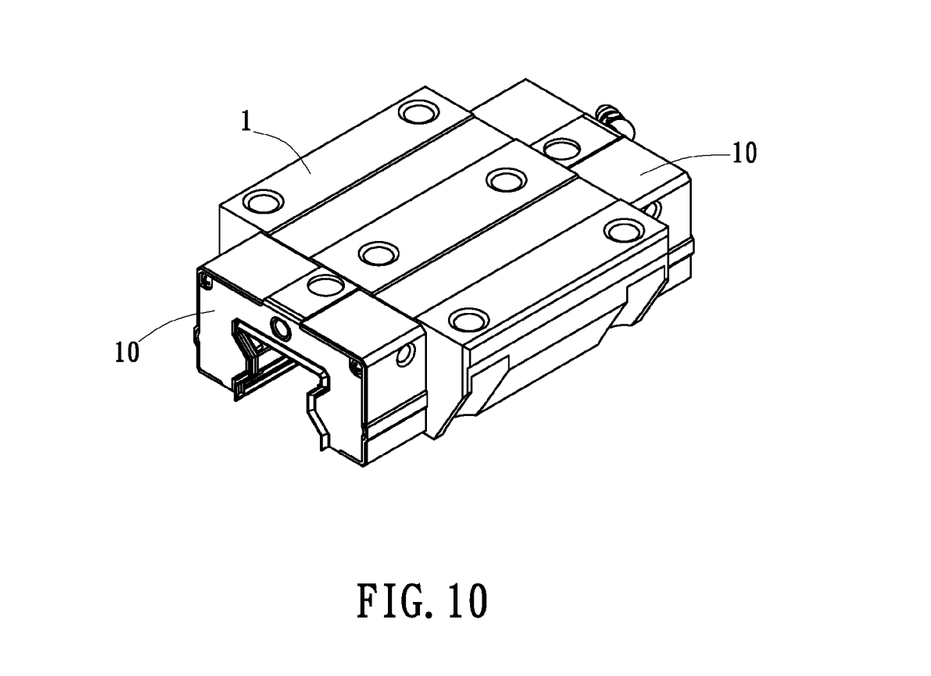
FIG. 10 illustrates circulators mounted at the opposing front and rear sides of the linear slide in accordance with the present invention.

As illustrated in FIG. 8 and FIG. 9, the guide structures 4 and the back-flow guide structures 6 formed according to the aforesaid over-molding are kept in communication with the opposing front and rear sides of the metal base 1. Preferably, end blocks 9 are bilaterally molded on the opposing front and rear sides of the metal base 1 so that two circulators 10 can be mounted on the mounting bore columns 7 and respectively joined to the end blocks 9 (see FIG. 10). Thus, as illustrated in FIG. 3, two opposing end block forming portions 22 and two opposing mounting bore column forming portions 23 are provided in the cavity 21 of the injection mold 2 corresponding to the opposing front and rear sides of the metal base 1 after the metal base 1 is placed in the cavity 21, and the applied engineering plastic material 5 will be guided into the guide structure forming portions 31, the end block forming portions 22 and the mounting bore column forming portions 23, and molded to form the desired guide structures 4 in the metal base 1 and the mounting bore columns 7 and end blocks 9 at the opposing front and rear sides of the metal base 1.

Each end block 9 comprises a flat base portion 91 abutting the front or rear side of the metal base 1, a half-arc body 92 protruded over the front or rear side of the metal base 1, and a circulator groove 93 connected between two opposite ends of the half-arc body 92 and disposed in communication between one respective load track 12 and one respective non-load track 17, and thus each circulator 10 provides a passage in communication between ne respective load track 12 and one respective non-load track 17. By means of the integrated design of end blocks 9, the cylindrical rolling elements can be rotated through the circulators 10 smoothly without causing noises.

Referring to FIG. 6 and FIG. 9, the metal base 1 can be processed to provide a through hole 19 in communication between each first guide structure attachment portion 13A and each associated second guide structure attachment portions 13B, or between each guide structure attachment portion 13A two associated back-flow holes 15. During injection molding, the applied engineering plastic material 5 is guided into the through holes 19 and molded to form an anchoring structure between each two adjacent guide structures 4, enhancing positioning stability of the guide structures 4 at two opposite lateral sides of the track groove 11.

Thus, subject to the design of the guide structure attachment portions 13 and first joint surfaces 14 at two opposite sidewalls of the track groove 11 of the metal base 1, and the design of the guide structure forming portion 31 and second joint surface 32 of the first core 3, a gap about 0.02 mm~0.04 mm is maintained between each first joint surface 14 and the associated second joint surface 32, the track groove 11 of the metal base 1 can be smoothly fitted onto the first core 3 in the injection mold 2; providing a gap about 0.02 mm~0.04 mm between each first joint surface 14 and the associated second joint surface 32 can effectively prohibit an overflow of the applied molten engineering plastic material 2, avoiding formation of plastic flush at the molded guide structures 4. Further, the invention requires a good machining method to control geometric precision of the first joint surfaces 14 of the metal base 1 so that a gap about 0.02 mm~0.04 mm can be obtained between the first joint surfaces 14 and the respective second joint surfaces 32. Therefore, a high-precision grinder is used for grinding the metal base 1 to provide the desired first joint surfaces 14, enabling the geometric size of the first joint surfaces 14 to be precisely controlled so that a high pass rate in molding plastic components on the metal base 1 can be achieved. Therefore, the invention employs over-molding to mold guide structures 4 on the metal base 1 at two opposite sidewalls of the track groove 11, achieving the effects of production efficiency improvement and cost reduction.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A linear slide over-molding fabrication method, comprising:
   a first step of preparing a linear slide metal base and placing said linear slide metal base in a cavity of an injection mold;
   a second step of filling a molten engineering plastic material into said cavity of said injection mold to form guide structures on said linear slide metal base adapted for guiding a roller chain, wherein said linear slide metal base comprises a straight track groove located in a bottom side in communication between opposing front and rear sides thereof for mating with a linear guideway, three guide structure attachment portions located in said bottom side at each of two opposite sidewalls of said straight track groove in a parallel relationship and in communication between said opposing front and rear sides of said linear slide metal base, and two first joint surfaces located in said bottom side at each of said two opposite sidewalls of said straight track groove and at two opposite sides relative to the respective said three guide structure attachment portions and in communication between said opposing front and rear sides of said linear slide metal base; and
   a sub step of preparing at least one first core and placing said at least one first core in said cavity to fit said strait track groove of said linear slide metal base after said first step and prior to said second step, said first core comprising a plurality of guide structure forming portions corresponding to said guide structure attachment portions, and a plurality of second joint surfaces respectively disposed in proximity to said first joint surfaces with a gap about 0.02 mm~0.04 mm therebetween so that filling said molten engineering plastic material into said cavity of said injection mold in said second step causes said engineering plastic material to fill up said guide structure forming portions and to form guide structures on said guide structure attachment portions at the two opposite sidewalls of said straight track groove and a load track between each two adjacent said guide structures.

2. The linear slide over-molding fabrication method as claimed in claim 1, wherein said three guide structure attachment portions include a first guide structure attachment portion abutting an open side of said straight track groove, a second guide structure attachment portion abutting a bottom side of said straight track groove, and a third guide structure attachment portion disposed between said first guide structure attachment portion and said second guide structure attachment portion; said first guide structure attachment portions and said second guide structure attachment portions each have two opposite sides thereof respectively connected to one respective said first joint surfaces; each said third guide structure attachment portion has two opposite lateral sides thereof respectively connected to one respective said first joint surface at one side of said first guide structure attachment portion and one respective said first joint surface at one side of said second guide structure attachment portion; said first core comprises three guide structure forming portions located at each of two opposite sides thereof respectively disposed corresponding to said first, second and said third guide structure attachment portions; and said second joint surfaces of said first core are respectively connected to the respective two opposite sides of the guide structure forming portions.

3. The linear slide over-molding fabrication method as claimed in claim 2, wherein said linear slide metal base further comprises two pairs of back-flow holes respectively disposed in two opposite sidewalls thereof in communication between the opposing front and rear sides thereof; second cores are mounted in said back-flow holes in communication with the opposing front and rear sides of said linear slide metal base, and a back-flow guide structure forming portion is provided between each said second core and an inner wall of one respective said back-flow hole, and thus, after filling of said molten engineering plastic material into said cavity of said injection mold, said molten engineering plastic material fills up said back-flow guide structure forming portions to form non-load tracks and back-flow guide structures.

4. The linear slide over-molding fabrication method as claimed in claim 2, wherein said linear slide metal base further comprises a plurality of sink holes respectively disposed adjacent to said back-flow holes; said engineering plastic material further fills up said sink holes to form a plurality of mounting bore columns at the opposing front and rear sides of said linear slide metal base.

5. The linear slide over-molding fabrication method as claimed in claim 4, wherein said linear slide metal base comprises a through hole between each said first guide structure attachment portion and one respective said second guide structure attachment portion or said back-flow hole; said engineering plastic material further fills up said through hole to form an anchoring structure between each said first guide structure attachment portion and one respective said second guide structure attachment portion or said back-flow hole.

6. The linear slide over-molding fabrication method as claimed in claim 4, wherein said cavity comprises a plurality of end block forming portions respectively disposed at opposing front and rear sides relative to said linear slide metal base in communication with said guide structure forming portions; said engineering plastic material further fills up said guide structure forming portions and said end block forming portion to form a plurality of end blocks at the opposing front and rear sides of said linear slide metal base, each said end block comprising a half-arc body and a circulator groove connected between two opposite ends of said half-arc body in communication with said load tracks and said non-load tracks.

7. A linear slide, comprising a linear slide metal base, said linear slide metal base comprising a straight track groove located in a bottom side in communication between opposing front and rear sides thereof for mating with a linear guideway, three guide structure attachment portions located in said bottom side at each of two opposite sidewalls of said straight track groove in a parallel relationship and in communication between said opposing front and rear sides of said linear slide metal base, a load track defined between each two adjacent said guide structure attachment portions, a plurality of first joint surfaces located in said bottom side at each of said two opposite sidewalls of said straight track groove and at two opposite sides relative to the respective said three guide structure attachment portions and in communication between said opposing front and rear sides thereof, a plurality of back-flow holes respectively disposed in two opposite sidewalls thereof in communication between the opposing front and rear sides thereof and a plurality of sink holes respectively located in the opposing front and rear sides thereof and abutting opposing ends of said back-flow holes, a plurality of guide structures respectively molded on said guide structure attachment portions at the two opposite sidewalls of said straight track groove adapted for guiding cylindrical rolling elements of a chain belt, a non-load track and a back-flow guide structure molded in each said back-flow hole, a plurality of mounting bore columns molded on the opposing front and rear sides of said linear slide metal base and respectively partially embedded in said sink holes for the mounting of a circulator at each of the opposing front and rear sides of said linear slide metal base, a plurality of through holes located in said linear slide metal base, and a plurality of anchoring structures,     wherein said three guide structure attachment portions include a first guide structure attachment portion abutting an open side of said straight track groove, a second guide structure attachment portion abutting a bottom side of said straight track groove, and a third guide structure attachment portion disposed between said first guide structure attachment portion and said second guide structure attachment portion, said first guide structure attachment portions and said second guide structure attachment portions each having two opposite sides thereof respectively connected to one respective said first joint surfaces, each said third guide structure attachment portion having two opposite lateral sides thereof respectively connected to one respective said first joint surface at one side of said first guide structure attachment portion and one respective said first joint surface at one side of said second guide structure attachment portion,     wherein the plurality of through holes are respectively connected between one respective said first guide structure attachment portion and one respective said second guide structure attachment portion or said back-flow hole, and     wherein the plurality of anchoring structures are respectively connected between one respective said first guide structure attachment portion and one respective said second guide structure attachment portion or said back-flow hole.

8. The linear slide as claimed in claim 7, further comprising a plurality of end blocks respectively located at the opposing front and rear sides of said linear slide metal base, each said end block comprising a half-arc body and a circulator groove connected between two opposite ends of said half-arc body in communication with said load tracks and said non-load tracks.

* * * * *